(12) United States Patent
Hagiya et al.

(10) Patent No.: US 7,652,848 B2
(45) Date of Patent: Jan. 26, 2010

(54) SUSPENSION FOR MAGNETIC HEAD SLIDER CHARACTERISTIC TEST

(75) Inventors: Shinobu Hagiya, Kanagawa-ken (JP); Haruhide Takahashi, Kanagawa-ken (JP); Kousaku Wakatsuki, Kanagawa-ken (JP); Takayoshi Ohtsu, Kanagawa (JP)

(73) Assignee: Hitachi Global Storage Technologies Natherlands B.V., Amsterdam (NL)

( * ) Notice: Subject to any disclaimer, the term of this patent is extended or adjusted under 35 U.S.C. 154(b) by 555 days.

(21) Appl. No.: 11/698,367

(22) Filed: Jan. 25, 2007

(65) Prior Publication Data

US 2007/0183096 A1    Aug. 9, 2007

(30) Foreign Application Priority Data

Feb. 6, 2006    (JP) .............................. 2006-028190

(51) Int. Cl.
G11B 5/48    (2006.01)
(52) U.S. Cl. .................................................. 360/245.7
(58) Field of Classification Search ............. 360/245.7, 360/244.8, 245.3, 245.5, 265.9, 294.4, 254.8, 360/244.9, 254.7, 246.3, 246.8; 29/603.03, 29/603.06
See application file for complete search history.

(56) References Cited

U.S. PATENT DOCUMENTS

| | | | |
|---|---|---|---|
| 6,320,729 B1 * | 11/2001 | Coon | 360/245.7 |
| 6,445,546 B1 * | 9/2002 | Coon | 360/245.7 |
| 6,587,309 B2 * | 7/2003 | Nojima | 360/245.7 |
| 6,587,311 B1 * | 7/2003 | Niijima et al. | 360/255 |
| 6,611,402 B1 * | 8/2003 | Mangold | 360/255 |
| 7,489,477 B1 * | 2/2009 | Padeski | 360/245.7 |
| 7,535,677 B2 * | 5/2009 | Kang | 360/245.7 |
| 2004/0008449 A1 * | 1/2004 | Girard | 360/245.7 |
| 2004/0032695 A1 * | 2/2004 | Sassine et al. | 360/245.7 |
| 2005/0174696 A1 * | 8/2005 | Choi et al. | 360/245.7 |
| 2007/0097553 A1 * | 5/2007 | Yao | 360/294.4 |
| 2007/0139823 A1 * | 6/2007 | Yao et al. | 360/294.4 |

FOREIGN PATENT DOCUMENTS

| | | |
|---|---|---|
| JP | 11-312373 | 11/1999 |
| JP | 2003-288709 | 10/2003 |

* cited by examiner

*Primary Examiner*—Allen T Cao
(74) *Attorney, Agent, or Firm*—Townsend and Townsend and Crew LLP; John Henkhaus

(57) ABSTRACT

Embodiments in accordance with the present invention provide a magnetic head slider to be easily mounted on or dismounted from a suspension and can hold a magnetic head slider so as not to be removed due to a shock resultant from handling during a characteristic test and a manufacturing process. A load beam is formed with protruding portions on both sides. A flexure includes a frame portion, a plate portion, a spring portion, an E-shaped pressing portion, and a probe portion. The plate portion extends from a guide portion of the frame portion. The probe portion may be formed by partially cutting out the frame portion. A limiter is formed on both sides of the plate portion. The limiter protrudes from the rear of the load beam and has a hook-shaped tip. The hook-shaped portion of the limiter engages with the protruding portion 6 of the load beam to limit excess vertical movement of the flexure. A gap may be formed between the limiter and the protruding portion.

10 Claims, 8 Drawing Sheets

SUSPENSION FOR MAGNETIC HEAD SLIDER CHARACTERISTIC TEST

CROSS-REFERENCE TO RELATED APPLICATION

The instant nonprovisional patent application claims priority to Japanese Patent Application 2006-028190, filed Feb. 6, 2006, which is incorporated by reference herein for all purposes.

BACKGROUND OF THE INVENTION

Embodiments in accordance with the present invention relate to a suspension for testing characteristics of a magnetic head slider which is used in a magnetic disk drive.

A magnetic head slider is used for magnetically writing or reading data on a magnetic disk. Before being used in a magnetic disk drive, the magnetic head slider is tested for flying characteristic with a magnetic disk rotated and for electromagnetic transducing characteristic about writing and reading data on a magnetic disk. The magnetic head slider is attached to a suspension so as to be able to fly over the magnetic disk. A magnetic head formed on a slider is connected to an external characteristic tester via an electric connection terminal and a circuit pattern.

Conventionally, the magnetic head slider is fixed to gimbals of the suspension with adhesive. Ultrasonic bonding or soldering is used for an electric connection terminal of the magnetic head to the suspension's circuit pattern to form a head gimbal assembly (HGA). The HGA is attached to a characteristic tester for characteristic test. The characteristic test tests the flying characteristic and the writing and reading characteristic over a rotating magnetic disk.

The HGA-based characteristic test uses an HGA formed by using adhesive and ultrasonic bonding or soldering. When an HGA is determined to be faulty, it is discarded entirely. For a high recording density magnetic disk unit in the future, the HGA uses highly-functional parts such as a suspension mounted with a complicated circuit patter and an actuator for positioning control of the magnetic head. Discarding a faulty HGA wastes costs for these parts and assembly works.

The wasted costs may be effectively decreased by removing the magnetic head slider and the adhesive from the HGA determined to be faulty as a result of the characteristic test and reusing remaining parts such as the suspension. However, there is a possibility of increasing costs by damaging parts or increasing man-hours due to removal of the adhesive.

Patent document 1 (JP-A No. 312373/1999) describes the HGA using the plate member having the mechanism capable of attaching and detaching the slider. The HGA is bonded to the gimbals with an adhesive between gimbals and the slider of the suspension mounted on a magnetic disk drive, not the suspension for magnetic head slider characteristic test. Patent document 1 describes the detachable mechanisms including the electromagnetic detachable mechanism using a magnetic layer for the slider rear side opposite to the gimbals, the vacuum adsorption detachable mechanism with a dimple formed in the plate member, and the detachable mechanism using a stable two-position shape member or a shape memory alloy.

The suspension for magnetic head slider needs to be reusable by removing a slider determined to be faulty according to a magnetic head slider characteristic test and mounting another slider. For this purpose, there is a need for the mechanism that can facilitate mounting and dismounting a slider, prevent an increase in costs of damaged parts or increased man-hours for a mounting and dismounting work, and hold the slider so as not to be removed due to a shock caused from handling during the characteristic test and the manufacturing process.

The HGA described in Patent document 1 (JP-A No. 312373/1999) can be used for the suspension for magnetic head slider characteristic test. However, the electromagnetic mechanism needs a magnetic layer formed on the slider surface opposite to the suspension and a circuit for mounting and dismounting control. The electromagnetic mechanism may increase manufacturing costs due to a complicated manufacturing process. The vacuum adsorption mechanism may decrease a holding force due to air leakage from the depressurized adsorption portion or thermal expansion of air caused by the ambient temperature. The mechanism using the stable two-position shape member or the shape memory alloy is subject to limitation on the use of materials, temperatures, and the like.

BRIEF SUMMARY OF THE INVENTION

Embodiments in accordance with the present invention provide a magnetic head slider to be easily mounted on or dismounted from a suspension and can hold a magnetic head slider so as not to be removed due to a shock resultant from handling during a characteristic test and a manufacturing process. Referring to the particular embodiment of FIG. 1, a load beam 2 is formed with protruding portions 6 on both sides. A flexure 8 includes a frame portion 10, a plate portion 12, a spring portion 14, an E-shaped pressing portion 16, and a probe portion 18. The plate portion 12 extends from a guide portion 10b of the frame portion 10. The probe portion 18 is formed by partially cutting out the frame portion 10. A limiter 20 is formed on both sides of the plate portion 12. The limiter 20 protrudes from the rear of the load beam 2 and has a hook-shaped tip. The hook-shaped portion of the limiter 20 engages with the protruding portion 6 of the load beam 2 to limit excess vertical movement of the flexure 8. A gap is formed between the limiter 20 and the protruding portion 6.

For a more complete understanding of the present invention, reference is made to the following detailed description taken in conjunction with the accompanying drawings.

DETAILED DESCRIPTION OF THE INVENTION

It is an object of an embodiment of the present invention to provide a suspension for magnetic head slider characteristic test capable of facilitating mounting and dismounting a magnetic head slider and holding the magnetic head slider so as not to be removed.

To achieve the above-mentioned object, the suspension for magnetic head slider characteristic test according to an embodiment of the present invention includes: a load beam having a protruding portion protruding from both sides of one end; a flexure having: one end attached to one end of the load beam; a frame portion provided with both sides and guide portions for the both sides; a plate portion extending from the guide portion of the frame portion to a side for mounting the load beam; a spring portion extending from the plate portion; a pressing portion forming a tip of the spring portion; a probe portion formed on the guide portion of the frame portion and positioned opposite to the pressing portion; and a limiter that extends from both sides of the plate portion over a protruding portion of the load beam and is tipped with a hook-shaped portion facing to the protruding portion with a gap therebetween; and a circuit pattern that is layered on the load beam and the flexure and is connected to the probe portion via the flexure's frame portion, wherein a magnetic head slider is placed on the plate portion and is held between the probe portion and the pressing portion by means of force applied from the spring portion.

The limiter comes into contact with the protruding portion to limit displacement of the flexure in a direction separate from the load beam. The limiter is formed by bending hook-shaped portions protruding from the plate portion at both sides toward the load beam. The spring portion is formed by zigzag bending part of the plate portion. The probe portion is formed by cutting out the guide portion of the frame portion. The present invention can provide a suspension for magnetic head slider characteristic test capable of facilitating mounting and dismounting a magnetic head slider and holding the magnetic head slider so as not to be removed.

Embodiments of the present invention will be described in further detail with reference to the accompanying drawings.

Figure 1:
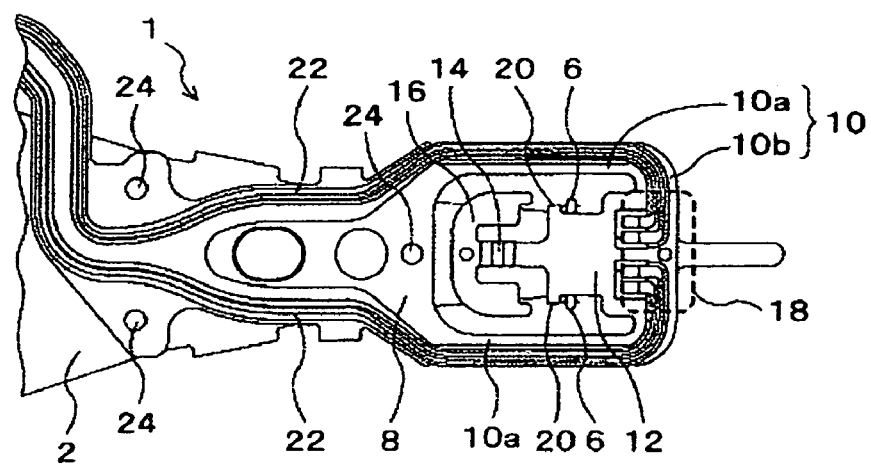
FIG. 1A is a top view of a suspension for magnetic head slider characteristic test according to an embodiment of the invention observed from a slider mounting side.
FIG. 1B is a side view of FIG. 1A.
FIG. 1C is the rear of FIG. 1A, i.e., a top view of the suspension for characteristic test observed from a side opposite the slider mounting side observed from a side opposite the slider mounting side.
Figure 1:
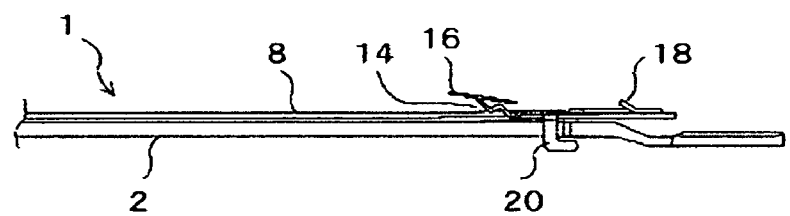
Figure 1:
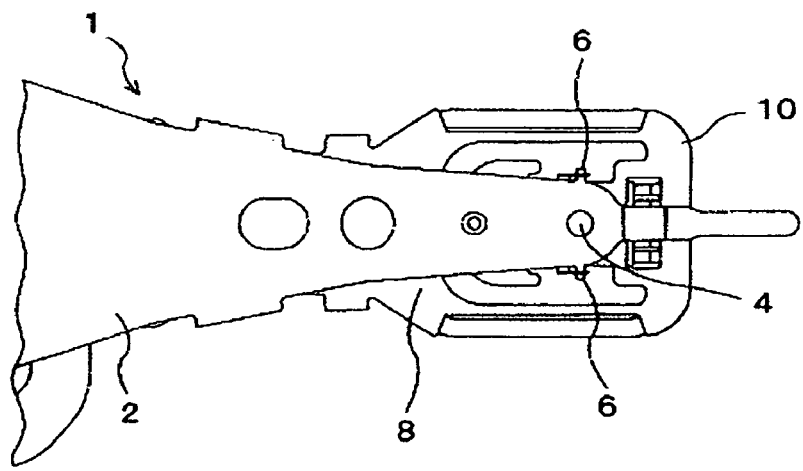

FIGS. 1A through 1C show the construction of a suspension for magnetic head slider characteristic test according to an embodiment of the invention. FIG. 1A is a top view observed from a slider mounting side. FIG. 1B is a side view. FIG. 1C is a top view observed from a side opposite to the slider mounting side. In FIGS. 1A through 1C, the suspension for magnetic head slider characteristic test (hereafter referred to simply as a suspension) has a load beam 2 and a flexure 8. One end of the load beam 2 is joined to one end of the flexure 8 by means of welding (a joint portion designated by reference numeral 24). One end of the load beam 2 is formed with a dimple 4 (see FIG. 1C). A tip of the flexure 8 is provided with a load via the dimple 4. One end of the load beam 2 is further formed with protruding portions 6 on both sides. The other end of the load beam 2 is attached to a characteristic tester during a characteristic test.

The flexure 8 includes a frame portion 10, a plate portion 12, a spring portion 14, an E-shaped pressing portion 16, and a probe portion 18. The frame portion 10 includes a side portion 10a and a guide portion 10b. The plate portion 12 extends from the guide portion 10b of the frame portion 10 to the joint portion 24 with the load beam 2. The spring portion 14 extends from the plate portion 12. The pressing portion 16 forms a tip of the spring portion 14. The probe portion 18 is formed by partially cutting out the guide portion 10b of the frame portion 10. The plate portion 12 provides a holding portion of a magnetic head slider (see FIG. 3). As seen from FIG. 1B, the spring portion 14 is formed by zigzag bending part of the plate portion 12 to have stretch properties. Both sides of the pressing portion 16 spread in a direction apart from the spring portion 14. The pressing portion 16 is positioned opposite to the probe portion 18. A limiter 20 is formed on both sides of the plate portion 12. The limiter 20 protrudes from the rear of the load beam 2 and has a hook-shaped tip. The hook-shaped portion of the limiter 20 engages with the protruding portion 6 of the load beam 2 to limit excess vertical movement of the flexure 8. A gap is formed between the limiter 20 and the protruding portion 6.

A circuit pattern 22 is layered on slider mounting sides of the load beam 2 and the flexure 8. Each side has two conductor patterns, i.e., four patterns in total. The circuit pattern 22 runs through the side portion 10a and the guide portion 10b of the flexure 8 and is connected to four pin terminals of the probe portion 18. The other end of the circuit pattern 22 is connected to the characteristic tester via a connector.

Figure 2:
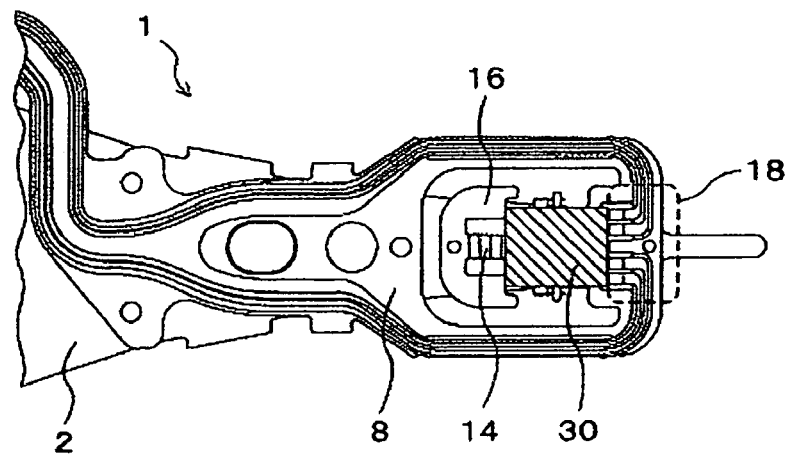
FIG. 2A is a top view of the suspension characteristic test provided with a magnetic head slider.
FIG. 2B is a side view of FIG. 2A.
Figure 2:
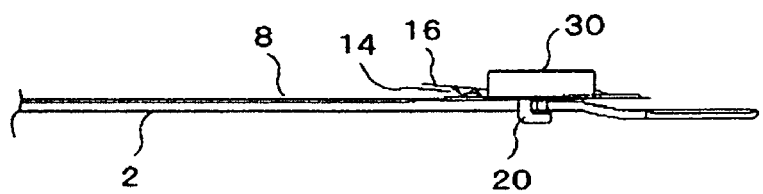
Figure 3:
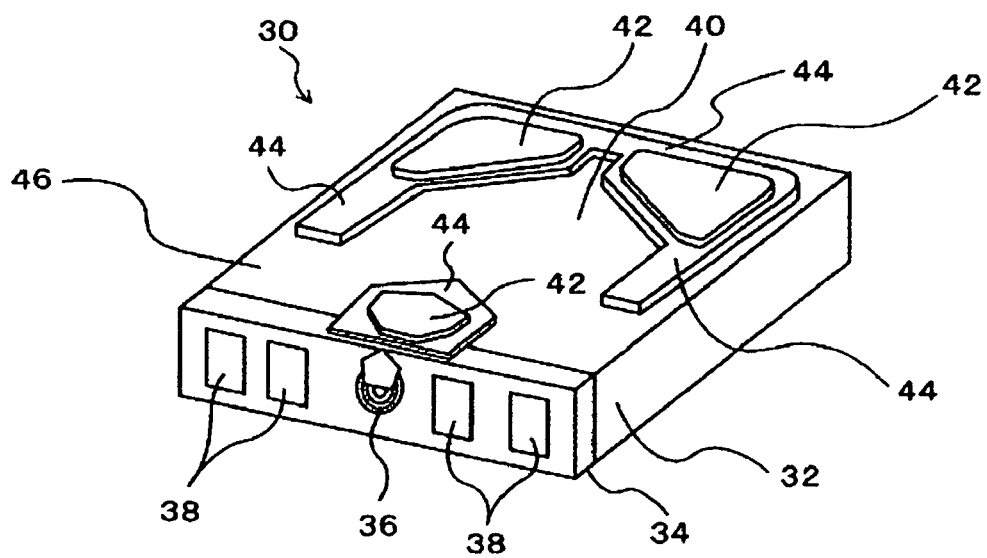
FIG. 3 is a perspective view showing an example of the magnetic head slider.

FIG. 2A shows a top view of the suspension 1 provided with a magnetic head slider 30. FIG. 2B shows a side view. With reference to FIG. 3, however, the following first describes a construction example of the magnetic head slider 30. The magnetic head slider 30 includes a slider 32 and a magnetic head device portion 34. The slider 32 is made of a ceramic material such as alumina-titanium carbide ($Al_2O_3$—TiC). The magnetic head device portion 34 is formed on the trailing portion of the slider 32. A magnetic head 36 is provided in the magnetic head device portion 34. A protection layer is formed on the magnetic head device portion 34 to form an electric connection terminal 38 that is connected to a read device and a write device of the magnetic head 36. The air bearing surface 40 of the slider 32 faces against a magnetic disk. On the air bearing surface 40, there are formed a floating pad 42, a shallow groove rail 44, and a deep groove 46 needed to fly the slider 30 for a specified amount over a magnetic disk.

Now returning back to FIGS. 2A and 2B, of the magnetic head slider 30, the rear opposite to the air bearing surface 40 faces the plate 12 of the flexure 8. The electric connection terminal 38 is placed between the probe portion 18 and the pressing portion 16 so as to face the probe portion 18. A retracting force of the spring portion 14 holds the electric connection terminal 38 between the probe portion 18 and the pressing portion 16.

Figure 4:
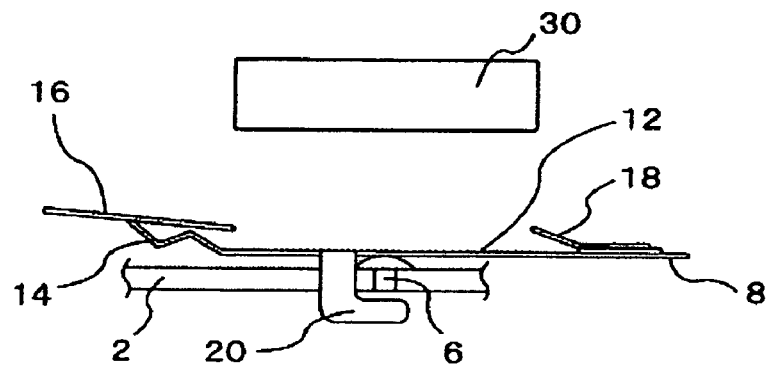
FIG. 4A shows how to mount the magnetic head slider on the suspension for characteristic test.
FIG. 4B shows how to mount the magnetic head slider on the suspension for characteristic test.
FIG. 4C shows how to mount the magnetic head slider on the suspension for characteristic test.
Figure 4:
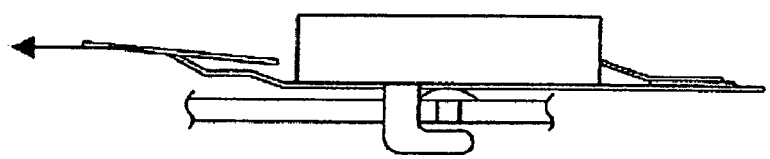
Figure 4:
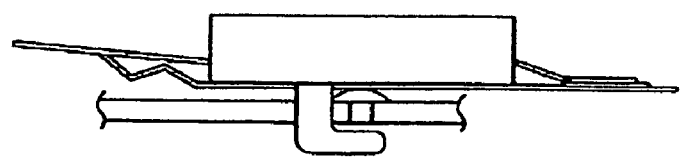

FIGS. 4A through 4C are used to describe how to mount the magnetic head slider 30. As shown in FIG. 4A, the magnetic head slider 30 is positioned so that its rear side faces the plate portion 12 of the flexure 8. As shown in FIG. 4B, the pressing portion 16 is pulled in a direction to extend the spring portion so that the magnetic head slider 30 is placed on the plate 12. As shown in FIG. 4C, releasing the pressing portion 16 retracts the spring portion 14. The magnetic head slider 30 is held between the pressing portion 16 and the probe portion 18. In this state, four pin terminals of the probe portion 18 come into electrical contact with the electric connection terminal 38 of the magnetic head 36. There is a gap between the limiter 20 and the protruding portion 6 so as not to cause contact or interference with each other. The mounting procedure is free from hindrance.

Figure 5:
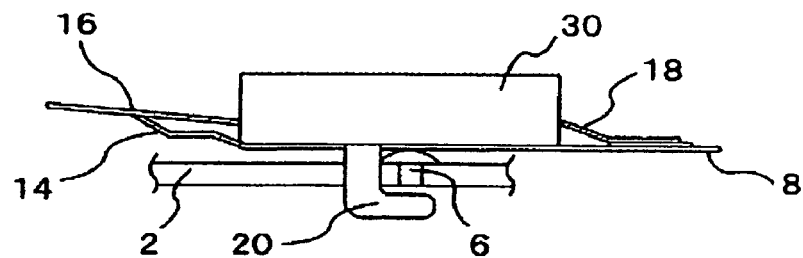
FIG. 5A shows how to dismount the magnetic head slider.
FIG. 5B shows how to dismount the magnetic head slider.
FIG. 5C shows how to dismount the magnetic head slider.
Figure 5:
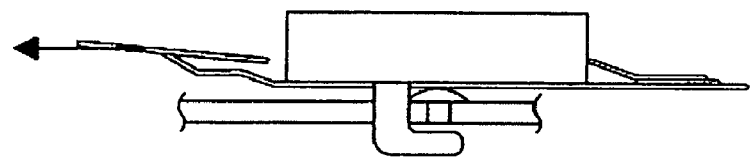
Figure 5:
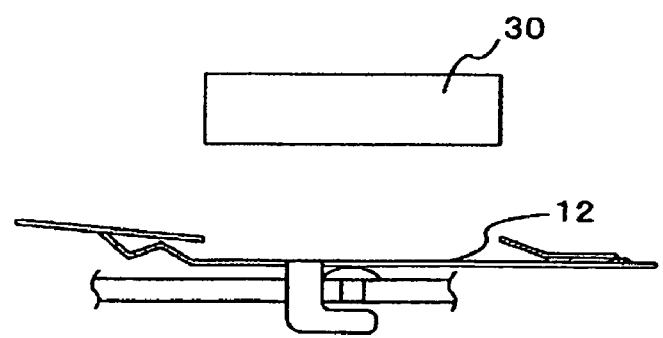

FIGS. 5A through 5C are used to describe how to dismount the magnetic head slider 30. FIG. 5A shows the magnetic head slider 30 mounted on the suspension 1. As shown in FIG. 5B, pulling the pressing portion 16 in a direction to extend the spring portion 14 widens the gap between the pressing portion 16 and the probe portion 18 to release the magnetic head slider 30. As shown in FIG. 5C, the released magnetic head slider 30 can be removed. Also in this case, there is a gap between the limiter 20 and the protruding portion 6 so as not to cause contact or interference with each other. The dismounting procedure is free from hindrance.

Figure 6:
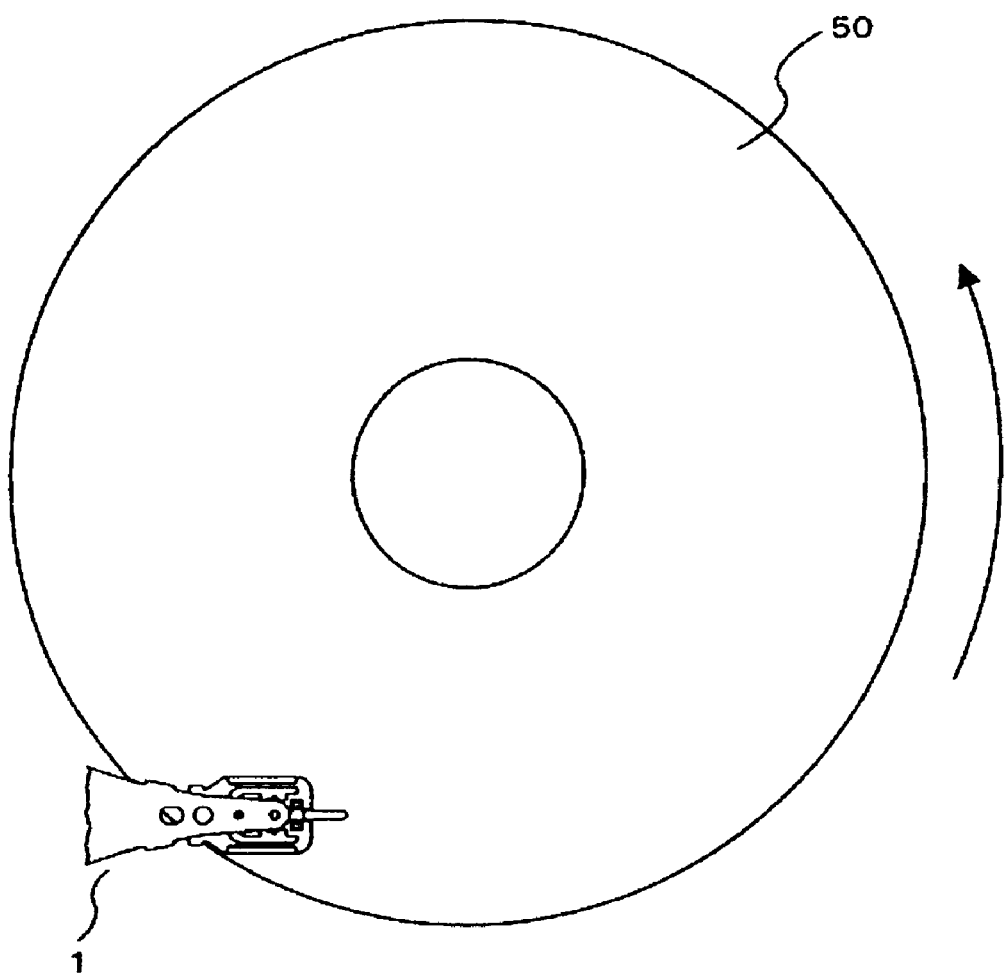
FIG. 6 shows a state where the magnetic head slider flies over a magnetic disk.

FIG. 6 is a top view showing that the magnetic head slider 30 attached to the suspension 1 for characteristic test flights over a rotating magnetic disk 50 to test flying characteristic of the magnetic head slider 30 and writing and reading characteristic of the magnetic head 36. The magnetic head slider 30 is provided with load from the load beam 2 in a direction to be pressed against the magnetic disk 50. The magnetic disk 50 rotates to generate a viscous laminar flow of air. The viscous laminar flow applies a floating force to the magnetic head slider 30. When the load balances with the floating force, the magnetic head slider 30 floats by keeping a specified distance between itself and the magnetic disk 50. The flexure 8 allows the magnetic head slider 30 to fly by flexibly following the surface swell of the rotating magnetic disk 50. The magnetic head 36 formed on the magnetic head slider 30 reads data or writes and reads data on the magnetic disk 50. A readout signal can be used to test the flying characteristic of the magnetic head slider 30 and the writing and reading characteristic (electromagnetic transducing characteristic) of the magnetic head 36.

Figure 7:
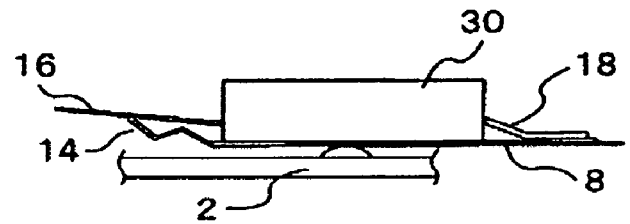
FIG. 7A shows behavior of the magnetic head slider when no limiter is used.
FIG. 7B shows behavior of the magnetic head slider when no limiter is used.
FIG. 7C shows behavior of the magnetic head slider when no limiter is used.
FIG. 7D shows behavior of the magnetic head slider when no limiter is used.
FIG. 7E shows behavior of the magnetic head slider when no limiter is used.
Figure 7:
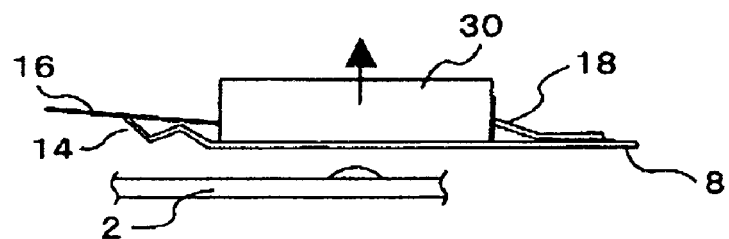
Figure 7:
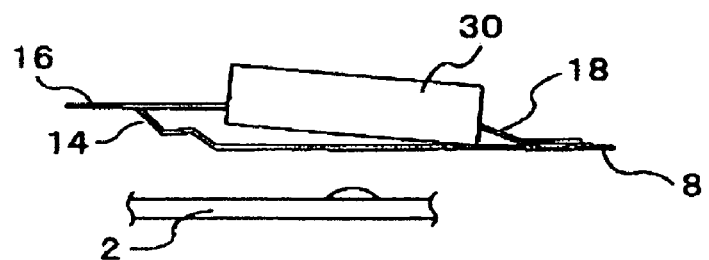
Figure 7:
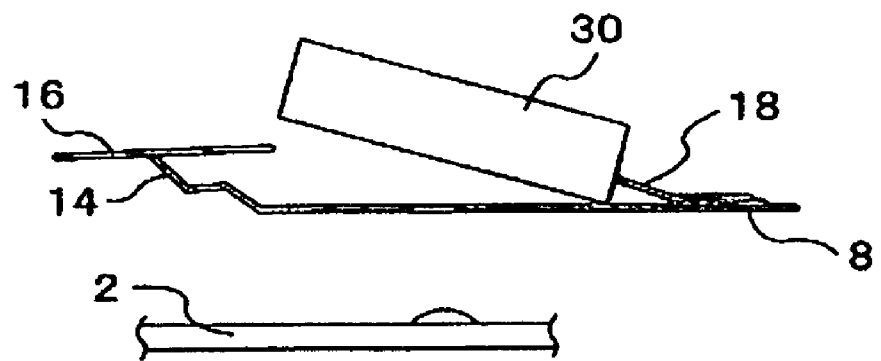
Figure 7:
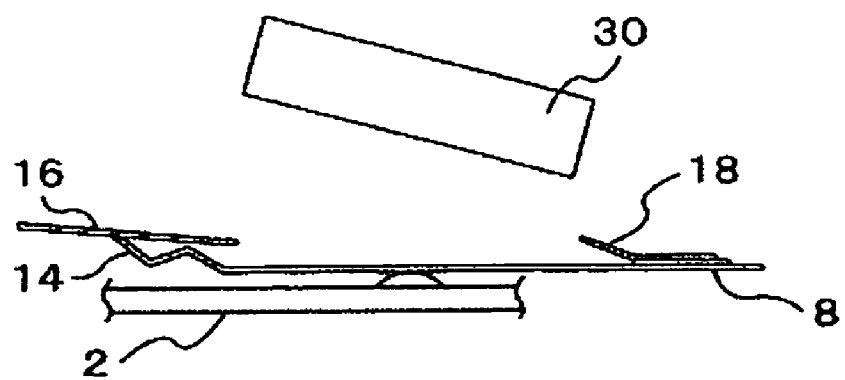

FIGS. 7A through 7E and 8A through 8C are used to describe effects depending on whether or not the limiter 20 is provided during the magnetic head slider 30's characteristic test. FIGS. 7A through 7E show a case where the limiter 20 is not used. FIG. 7A shows that the magnetic head slider 30 is attached to the suspension for characteristic test. In this state, applying a shock displaces the magnetic head slider 30 and the flexure 8 in a direction apart from the load beam 2 as shown in FIG. 7B. The magnetic head slider 30 is simply sandwiched between the pressing portion 16 and the probe portion 18 by the retracting force of the spring portion 14. The magnetic head slider 30 is not fixed by an adhesive and the like. Applying a larger shock displaces the magnetic head slider 30 so as to be separate from the flexure 8 as shown in FIG. 7C. When an applied force is larger than the force to hold the magnetic head slider 30 between the pressing portion 16 and the probe portion 18, the magnetic head slider 30 is removed from the flexure 8 as shown in FIGS. 7D and 7E. When the magnetic head slider 30 is removed, the characteristic test cannot be conducted correctly. When the magnetic head slider 30 is removed during the characteristic test, the magnetic disk 50 may be damaged.

Figure 8:
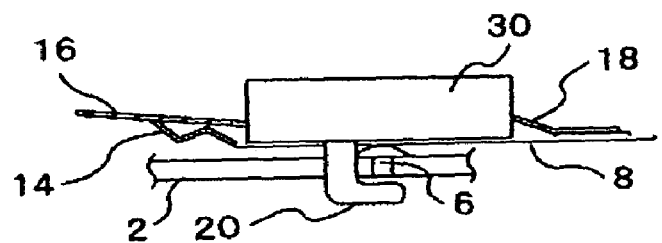
FIG. 8A shows behavior of the magnetic head slider when a limiter is used.
FIG. 8B shows behavior of the magnetic head slider when the limiter is used.
FIG. 8C shows behavior of the magnetic head slider when the limiter is used.
Figure 8:
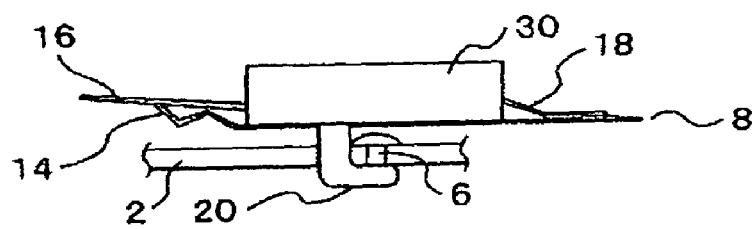
Figure 8:
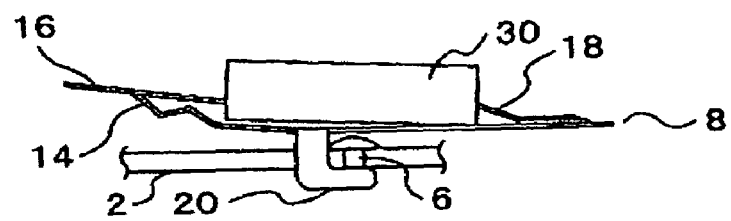

FIGS. 8A through 8C show the behavior of the magnetic head slider 30 when the limiter 20 is used. FIG. 8A shows a state where the magnetic head slider 30 is mounted on the suspension 1 for characteristic test. In this state, applying a shock displaces the magnetic head slider 30 and the flexure 8 in a direction apart from the load beam 2 as shown in FIG. 8B. The displacement is limited where the limiter 20 touches the protruding portion 6 of the load beam 2. Applying a larger shock displaces the magnetic head slider 30 so as to be separate from the flexure 8 as shown in FIG. 8C. In this case, the limiter 20 fastens around the root of the spring portion 14 so as to be hardly separate from the load beam 2. The rigidity of the spring portion 14 increases to amplify the force to hold the magnetic head slider 30. In this manner, applying a large shock hardly removes the magnetic head slider 30 from the flexure 8.

There has been described the removal of the magnetic head slider 30 due to a shock applied during the operation. Further, the magnetic head slider 30 may be removed when it is applied with too large a negative pressure during the characteristic test.

According to an embodiment of the present invention, there is a gap between the limiter 20 and the protruding portion 6 so as not to cause contact or interference with each other when the magnetic head slider 30 is mounted or dismounted or is floated over the disk 50. When the magnetic head slider 30 is displaced so as to be apart from the load beam 2, the limiter 20 comes into contact with the protruding portion 6 to limit the displacement. In this case, the limiter 29 fastens around the root of the spring portion 14 so as to be hardly separate from the load beam 2. This amplifies the force to sandwich the magnetic head slider 30 between the pressing portion 16 and the probe portion 18, making it possible to prevent the magnetic head slider 30 from being removed from the flexure 8.

It is possible to prevent the magnetic head slider from being removed due to handling during a manufacturing process or a shock applied during the characteristic test and protect the magnetic disk against damage. This makes it possible to reliably conduct the characteristic test for a magnetic head slider itself, decrease parts to be discarded due to a characteristic failure, and save manufacturer costs.

While the present invention has been described with reference to specific embodiments, those skilled in the art will appreciate that different embodiments may also be used. Thus, although the present invention has been described with respect to specific embodiments, it will be appreciated that the present invention is intended to cover all modifications and equivalents within the scope of the following claims.

What is claimed is:

1. A suspension for magnetic head slider characteristic test comprising:
   a load beam;
   a flexure that is attached to the load beam at one end, includes a frame portion and a magnetic head slider holding portion, and holds a magnetic head slider between a spring portion formed on the magnetic head slider holding portion and a probe portion; and
   a circuit pattern that is layered on the load beam and the flexure and is connected to the probe portion,
   wherein, when the magnetic head slider and the flexure are displaced in a direction to be separate from the load beam, the flexure has a mechanism that engages with part of the load beam to limit displacement of the flexure.

2. The suspension for magnetic head slider characteristic test according to claim 1, wherein the mechanism to limit displacement of the flexure is formed by extending part of both sides of the flexure's magnetic head slider holding portion beyond the load beam;

wherein a tip of the mechanism faces, with a gap, to a protruding portion protruding from each of both sides of the load beam; and wherein, when the magnetic head slider and the flexure are displaced more largely than the gap, the tip touches the protruding portion.

3. The suspension for magnetic head slider characteristic test according to claim 1, wherein the mechanism to limit displacement of the flexure is formed by bending a hook-shaped portion toward the load beam, the hook-shaped portion laterally protrudes from both sides of the flexure's magnetic head slider holding portion.

4. The suspension for magnetic head slider characteristic test according to claim 3, wherein the spring portion is formed by zigzag bending a part extending from the flexure's magnetic head slider holding portion.

5. The suspension for magnetic head slider characteristic test according to claim 4, wherein the probe portion is formed by cutting out part of the flexure's frame portion and faces to the spring portion.

6. A suspension for magnetic head slider characteristic test comprising:

a load beam having a protruding portion protruding from both sides of one end;

a flexure having: one end thereof attached to one end of the load beam; a frame portion provided with both sides and guide portions for the both sides; a plate portion extending from the guide portion of the frame portion to a side for mounting the load beam; a spring portion extending from the plate portion; a pressing portion forming a tip of the spring portion; a probe portion formed on the guide portion of the frame portion and positioned opposite to the pressing portion; and a limiter that extends from both sides of the plate portion over a protruding portion of the load beam and is tipped with a hook-shaped portion facing to the protruding portion with a gap therebetween; and a circuit pattern that is layered on the load beam and the flexure and is connected to the probe portion via the flexure's frame portion, wherein a magnetic head slider is placed on the plate portion and is held between the probe portion and the pressing portion by means of force applied from the spring portion.

7. The suspension for magnetic head slider characteristic test according to claim 6, wherein the limiter comes into contact with the protruding portion to limit displacement of the flexure in a direction separate from the load beam.

8. The suspension for magnetic head slider characteristic test according to claim 6, wherein the limiter is formed by bending hook-shaped portions protruding from the plate portion at both sides toward the load beam.

9. The suspension for magnetic head slider characteristic test according to claim 6, wherein the spring portion is formed by zigzag bending part of the plate portion.

10. The suspension for magnetic head slider characteristic test according to claim 6, wherein the probe portion is formed by cutting out the guide portion of the frame portion.

* * * * *